(12) United States Patent
Springer et al.

(10) Patent No.: US 11,456,554 B2
(45) Date of Patent: Sep. 27, 2022

(54) COVER ASSEMBLY FOR CHARGING PORT OF ELECTRIC MACHINES

(71) Applicant: Caterpillar Underground Mining Pty. Ltd., South Burnie (AU)

(72) Inventors: Steven D Springer, Naperville, IL (US); Nirmal Goldwin, Bangalore (IN)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 117 days.

(21) Appl. No.: 16/936,651

(22) Filed: Jul. 23, 2020

(65) Prior Publication Data
US 2022/0029342 A1    Jan. 27, 2022

(51) Int. Cl.
| | |
|---|---|
| H01R 13/447 | (2006.01) |
| E05B 83/34 | (2014.01) |
| H02J 7/00 | (2006.01) |
| B60K 15/05 | (2006.01) |

(52) U.S. Cl.
CPC ........... *H01R 13/447* (2013.01); *E05B 83/34* (2013.01); *H02J 7/0042* (2013.01); *B60K 15/05* (2013.01); *Y02T 10/70* (2013.01)

(58) Field of Classification Search
CPC ...... H01R 13/447; E05B 83/34; H02J 7/0042; B60K 15/05
See application file for complete search history.

(56) References Cited

U.S. PATENT DOCUMENTS

| | | | | |
|---|---|---|---|---|
| 5,857,569 | A | * | 1/1999 | Hoftman ............. A61M 5/3205 206/366 |
| 5,954,387 | A | * | 9/1999 | Fisher ................... B60K 15/05 296/97.22 |
| 9,515,418 | B2 | | 12/2016 | Yoshizawa et al. |
| 9,662,990 | B2 | | 5/2017 | Jeong et al. |
| 9,688,137 | B2 | | 6/2017 | Takahashi et al. |
| 9,969,279 | B2 | | 5/2018 | Southey et al. |
| 2011/0306223 | A1 | * | 12/2011 | Bauer ................ H01R 13/6397 439/136 |
| 2015/0274010 | A1 | | 10/2015 | Roth et al. |
| 2020/0001721 | A1 | | 1/2020 | Merryweather et al. |
| 2020/0101854 | A1 | | 4/2020 | Nakanishi et al. |
| 2020/0203899 | A1 | * | 6/2020 | Carter, III ............. H02G 3/185 |

FOREIGN PATENT DOCUMENTS

| | | |
|---|---|---|
| CN | 107336624 | 6/2019 |
| JP | 6409533 | 10/2018 |
| WO | 2017137210 W | 8/2017 |

* cited by examiner

*Primary Examiner* — Michael C Zarroli
(74) *Attorney, Agent, or Firm* — von Briesen & Roper, s.c.

(57) ABSTRACT

A cover assembly for a charging port of an electric machine includes a head plate, a non-metallic base plate, and a flexible membrane. The head plate extends across an opening of an outer panel assembly of the machine to define an aperture. The non-metallic base plate is movable with respect to the head plate to selectively open and close the aperture. The flexible membrane is fixedly coupled to the head plate and slidably engaged to the non-metallic base plate to enable the non-metallic base plate to slide with respect to the head plate and move between a folded state and an unfolded state with respect to the head plate. In the unfolded state, the non-metallic base plate closes the aperture, and, in the folded state, the non-metallic base plate opens the aperture to allow access to the charging port from an outside through the aperture.

20 Claims, 12 Drawing Sheets

COVER ASSEMBLY FOR CHARGING PORT OF ELECTRIC MACHINES

TECHNICAL FIELD

The present disclosure relates to charging ports for electric machines. More particularly, the present disclosure relates to a protective cover assembly for a charging port of an electric machine.

BACKGROUND

Machines applied in construction and mining environments may use electrical power for accomplishing various tasks, such as machine motion and implement actuation. Electrical power in such machines are typically sourced from a battery pack housed within the machine. Batteries within such battery packs need to be kept appropriately and/or fully charged so as to ensure that power for the accomplishing the various aforesaid tasks remain available. For charging the batteries of the battery pack, one or more charging ports are generally provided on such machines to which a charging plug or cable could be connected for charging the batteries.

Charging ports are often positioned at machine locations that are proximate to an outside of the machine for easy accessibility (e.g., to service technicians) from the outside of the machine. However, with such positioning, the charging ports remain exposed and prone to interferences with the features of an environment in which the machine may operate. In some cases, the environment may include limited spaces and narrow passageways (such as is commonly found in underground mining environments) where the chances of such interferences are relatively higher. Such interferences are undesirable as they can imperil the integrity and functioning of the charging ports and can also damage the charging ports, leading to machine downtime and loss in productivity.

U.S. Pat. No. 9,688,137 relates to a lid that opens and closes a concave portion accommodating a charging inlet provided on a vehicle, and a support arm supporting the lid so that the lid is movable between a fully closing position and a fully opening position for closing and opening the concave portion. The support arm includes first and second swinging arms.

SUMMARY OF THE INVENTION

In one aspect, the disclosure is directed to a cover assembly for a charging port of an electric machine. The cover assembly includes a head plate, a non-metallic base plate, and a flexible membrane. The head plate is coupled to an outer panel assembly of the electric machine. The head plate extends across an opening of the outer panel assembly to define an aperture with a portion of the opening. The non-metallic base plate is movable with respect to the head plate to selectively open and close the aperture. The flexible membrane is fixedly coupled to one of the head plate or the non-metallic base plate and slidably engaged to the other of the head plate or the non-metallic base plate to enable the non-metallic base plate to slide with respect to the head plate and move between a folded state and an unfolded state with respect to the head plate. In the unfolded state, the non-metallic base plate closes the aperture, and, in the folded state, the non-metallic base plate opens the aperture to allow access to the charging port from an outside of the machine through the aperture.

In another aspect, the disclosure is related to an electric machine. The electric machine includes a charging port, an outer panel assembly defining an opening, and a cover assembly for the charging port. The cover assembly includes a head plate, a non-metallic base plate, and a flexible membrane. The head plate is coupled to the outer panel assembly and extends across the opening to define an aperture with a portion of the opening. The non-metallic base plate is movable with respect to the head plate to selectively open and close the aperture. The flexible membrane is fixedly coupled to one of the head plate or the non-metallic base plate and slidably engaged to the other of the head plate or the non-metallic base plate to enable the non-metallic base plate to slide with respect to the head plate and move between a folded state and an unfolded state with respect to the head plate. In the unfolded state, the non-metallic base plate closes the aperture, and, in the folded state, the non-metallic base plate opens the aperture to allow access to the charging port from an outside of the machine through the aperture.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts.

Figure 1:
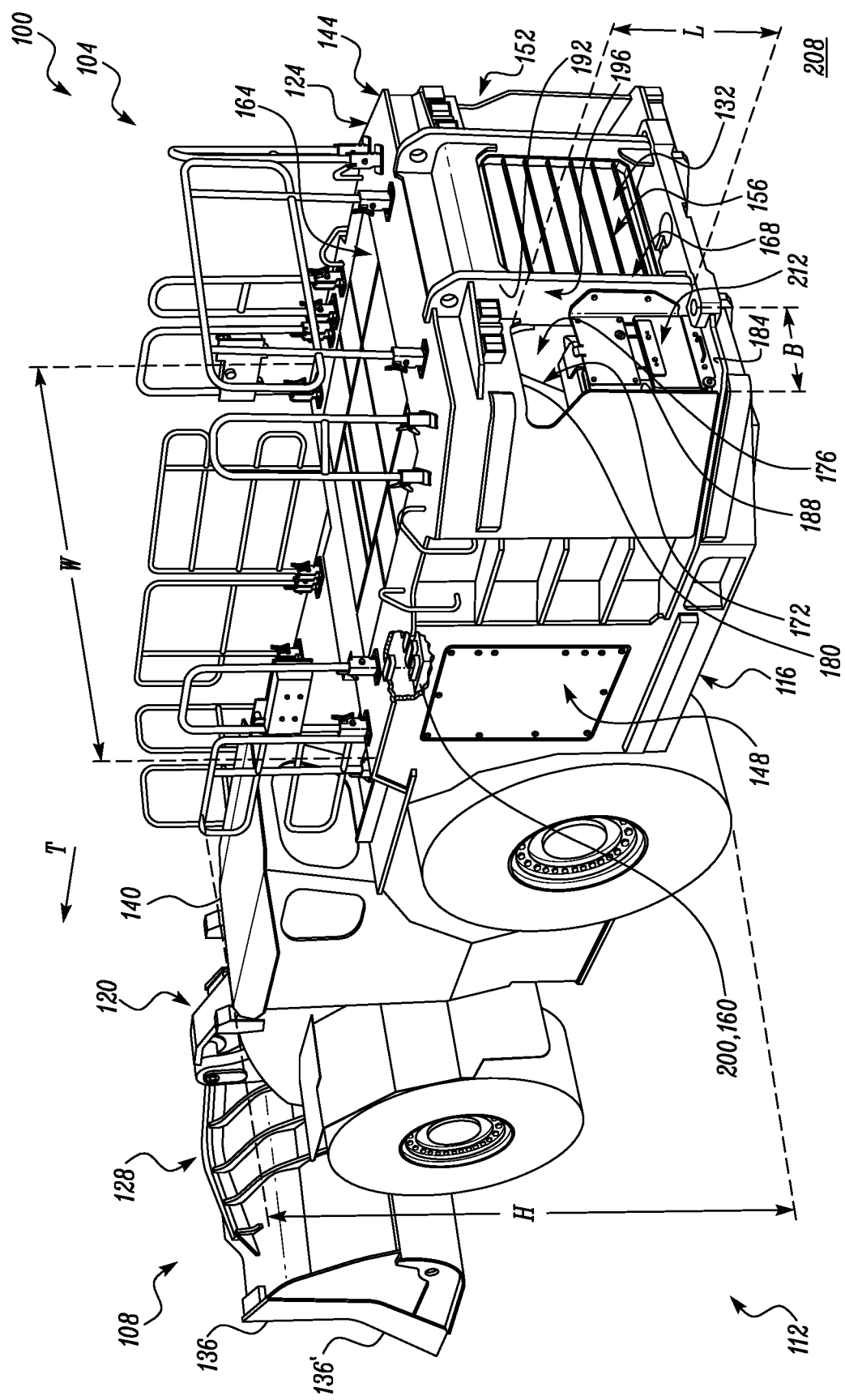
FIG. 1 is a perspective view of a machine having a cover assembly for covering and shielding a charging port of a battery pack of the machine, in accordance with an aspect of the present disclosure.

Referring to FIG. 1, a machine 100 is shown. The machine 100 may be electrically powered, either partly or fully, and, in one embodiment, may embody an electrically operated machine 104 or simply an electric machine 108. The machine 100 may be applied in mining environments and may embody a load-haul-dump (LHD) machine 112 that may be applicable in underground mining environments, although it is possible for the machine 100 to be applied in other environments, such as over ground mining, construction, and transportation. One or more aspects of the present disclosure may be applicable to other partly or fully electrically operating machines. The machine 100 may include a main frame assembly 116 that may include a split frame configuration enabling the machine 100 to acquire a forward portion 120 and a rearward portion 124 that are articulable with respect to each other (e.g., at a hitch joint) (not shown). The forward portion 120 defines a forward end 128 of the machine 100, while the rearward portion 124 defines a rearward end 132 of the machine 100.

Unless specified otherwise, terms such as 'forward', 'front', 'rear', 'rearward', as may be used in the present disclosure may be understood according to an exemplary direction, T, in which the machine 100 may move during operations. Said exemplary direction, T, is defined from the rearward end 132 towards the forward end 128 of the machine 100, as shown. Further, terms, such as 'left', 'right', 'top', 'bottom' 'upper', 'lower', and similar terms, may also be used in the present disclosure, and may be understood when viewing the machine 100 from the rearward end 132 towards the forward end 128 (i.e., along the exemplary direction, T).

The forward portion 120 of the machine 100 may include an implement 136 of the machine 100. The implement 136 may include a bucket 136' that may be articulable so as to receive and haul load. The rearward portion 124 of the machine 100 may include an operator cabin 140 and a power compartment 144 of the machine 100. The operator cabin 140 may be configured to house and station one or more operators of the machine 100, and may also include multiple input and output devices (e.g., joysticks, levers, control panels, touchscreens, etc.) (not shown) for the control of the many functions of the machine 100, e.g., machine motion and implement actuation.

The power compartment 144 may be configured to house a power source 160 of the machine 100, and may be located generally rearwards of the operator cabin 140 of the machine 100. The power compartment 144 may define multiple sides, and as may be viewed and comprehended from FIG. 1, the power compartment 144 may define a left side portion 148, a right side portion 152, a rearward side portion 156, a forward side portion (not visible in the view provided in FIG. 1), and a roof side portion 164. The rearward side portion 156 may define the rearward end 132 of the machine 100. Each of the left side portion 148, the right side portion 152, the rearward side portion 156, the forward side portion, and the roof side portion 164, may be formed by one or more outer panels of the machine 100. As an example, the outer panels that form the rearward side portion 156 of the power compartment 144 (at the rearward end 132) of the machine 100 may be referred to as an outer panel assembly 168 of the machine 100. The outer panel assembly 168 may define an opening 172. The opening 172 may provide access to an interior 176 of the power compartment 144 within which the power source 160 may be housed.

As shown, the opening 172 may be located towards the left bottom side of the rearward side portion 156 of the machine 100 (when viewing the machine 100 from the rearward end 132 towards the forward end 128), although it is possible for the opening 172 to be located elsewhere at the rearward side portion 156 of the machine 100. In some embodiments, the opening 172 may be defined at any of the other side portions of the machine 100, e.g., the opening 172 may be located at one (or more) of the left side portion 148, the right side portion 152, the forward side portion, or the roof side portion 164 of the machine 100. As shown, the opening 172 may be generally rectangular in shape, with a length, L, defined by the opening 172 extending along a height, H, of the machine 100 and a breadth, B, defined by the opening 172 extending along a width, W, of the machine 100. The opening 172 may define an upper opening side 180, a lower opening side 184, a first opening side 188, and a second opening side 192. For ease, the first opening side 188 and the second opening side 192 may be respectively referred to as a first side 188 and a second side 192, hereinafter.

Both the upper opening side 180 and the lower opening side 184 may be defined along the breadth, B, of the opening 172, while both the first side 188 and the second side 192 may be defined along the length, L, of the opening 172. The upper opening side 180 is spaced apart from the lower opening side 184, and, similarly, the first side 188 is spaced apart from the second side 192 to define the opening 172 therebetween. Combinedly, the upper opening side 180, the lower opening side 184, the first side 188, and the second side 192, may define an inner periphery 196 of the opening 172. The opening 172 may define other shapes, e.g., a square shape, than what has been disclosed and illustrated in the present disclosure.

Figure 7:
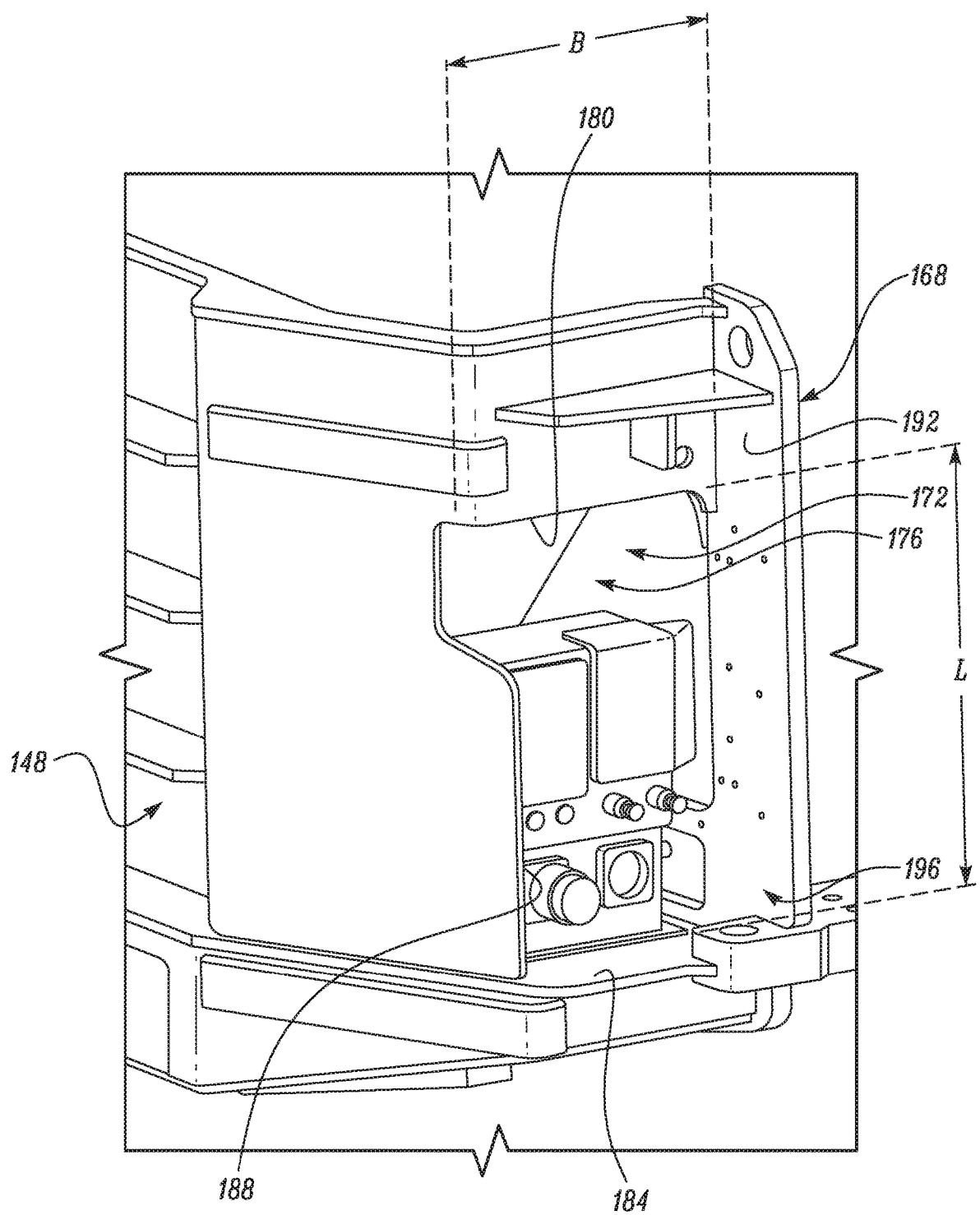
FIGS. 7-11 are views illustrating an exemplary process of assembling the cover assembly at an opening of the machine, in accordance with an aspect of the present disclosure.
Figure 8:
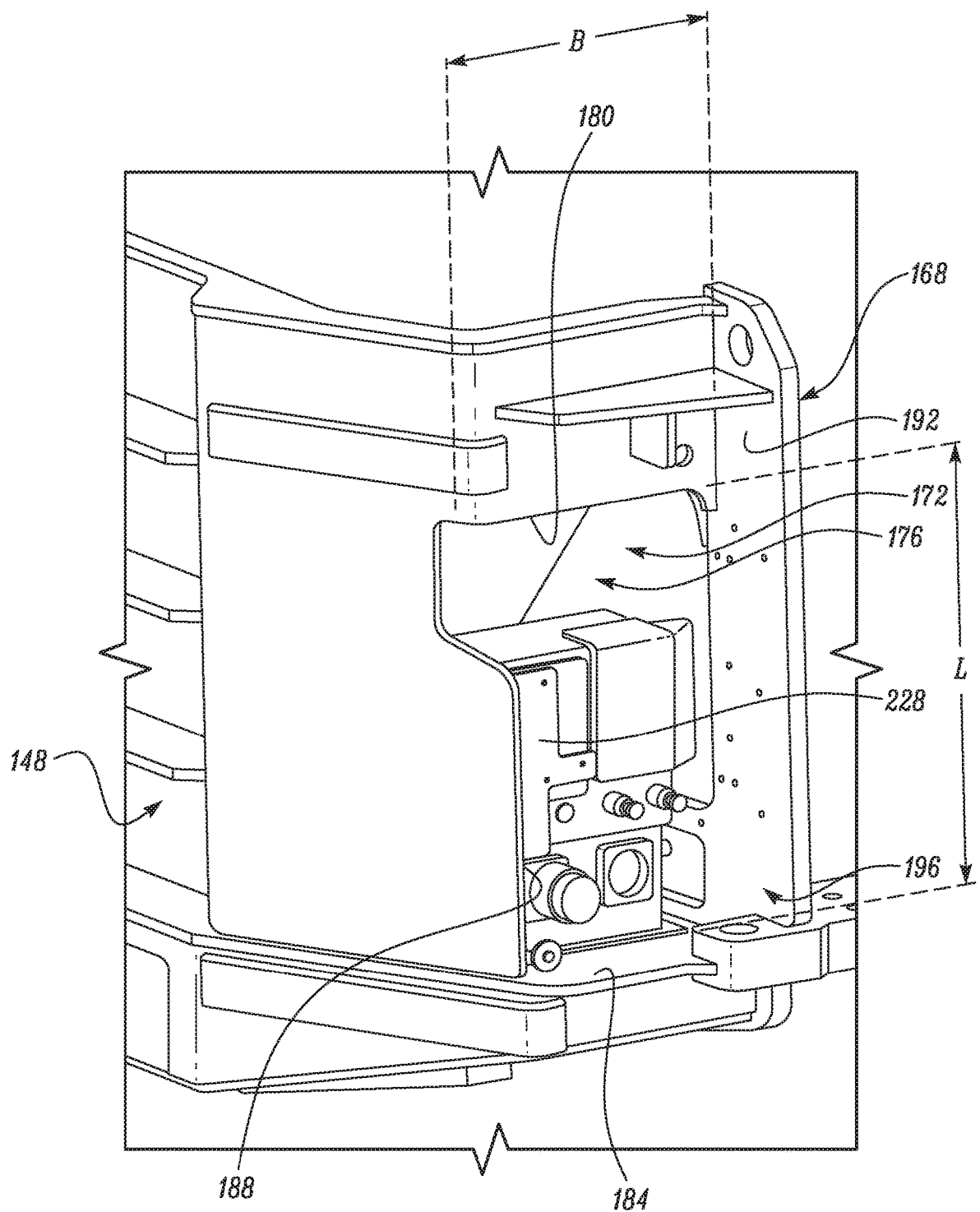
Figure 9:
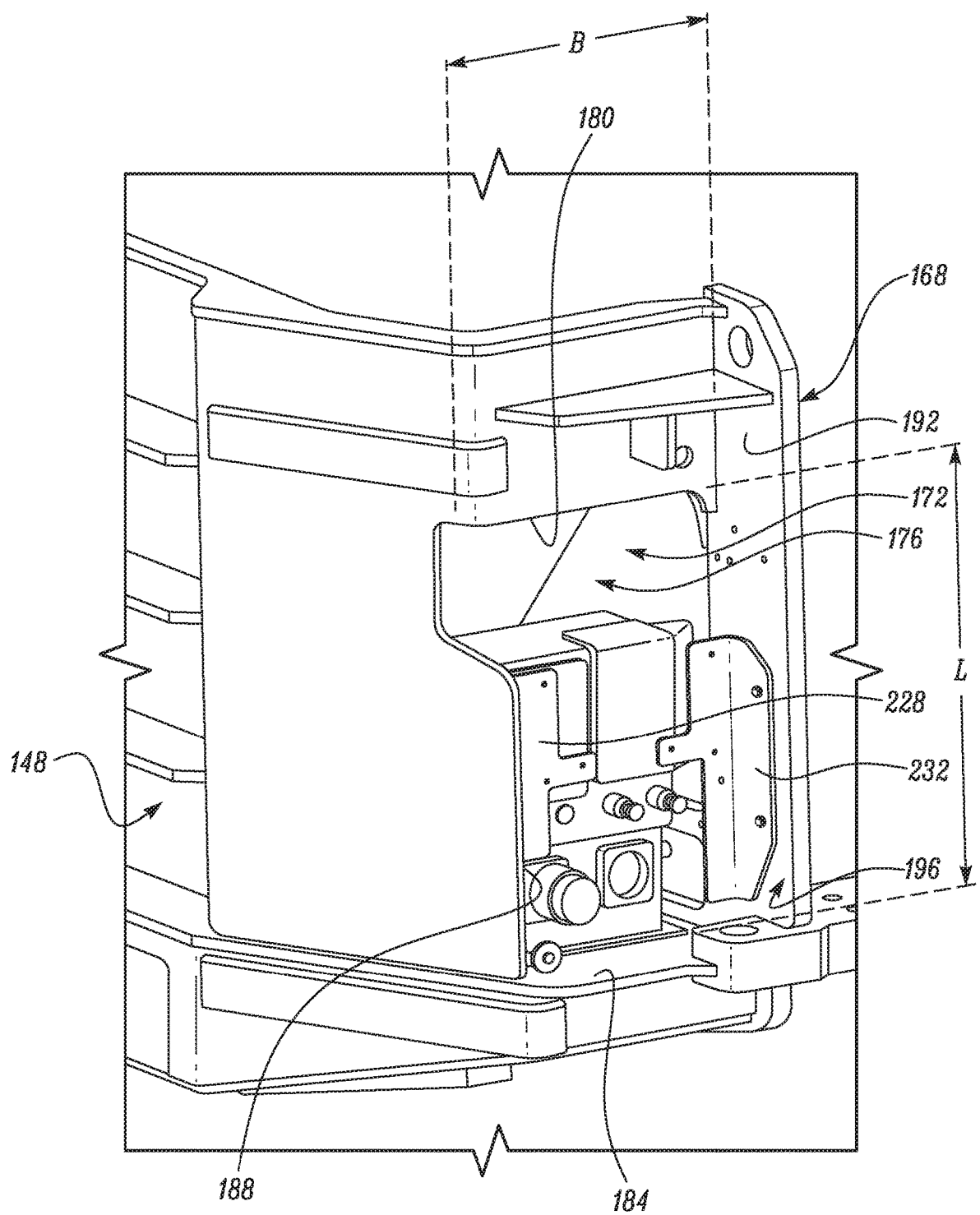
Figure 10:
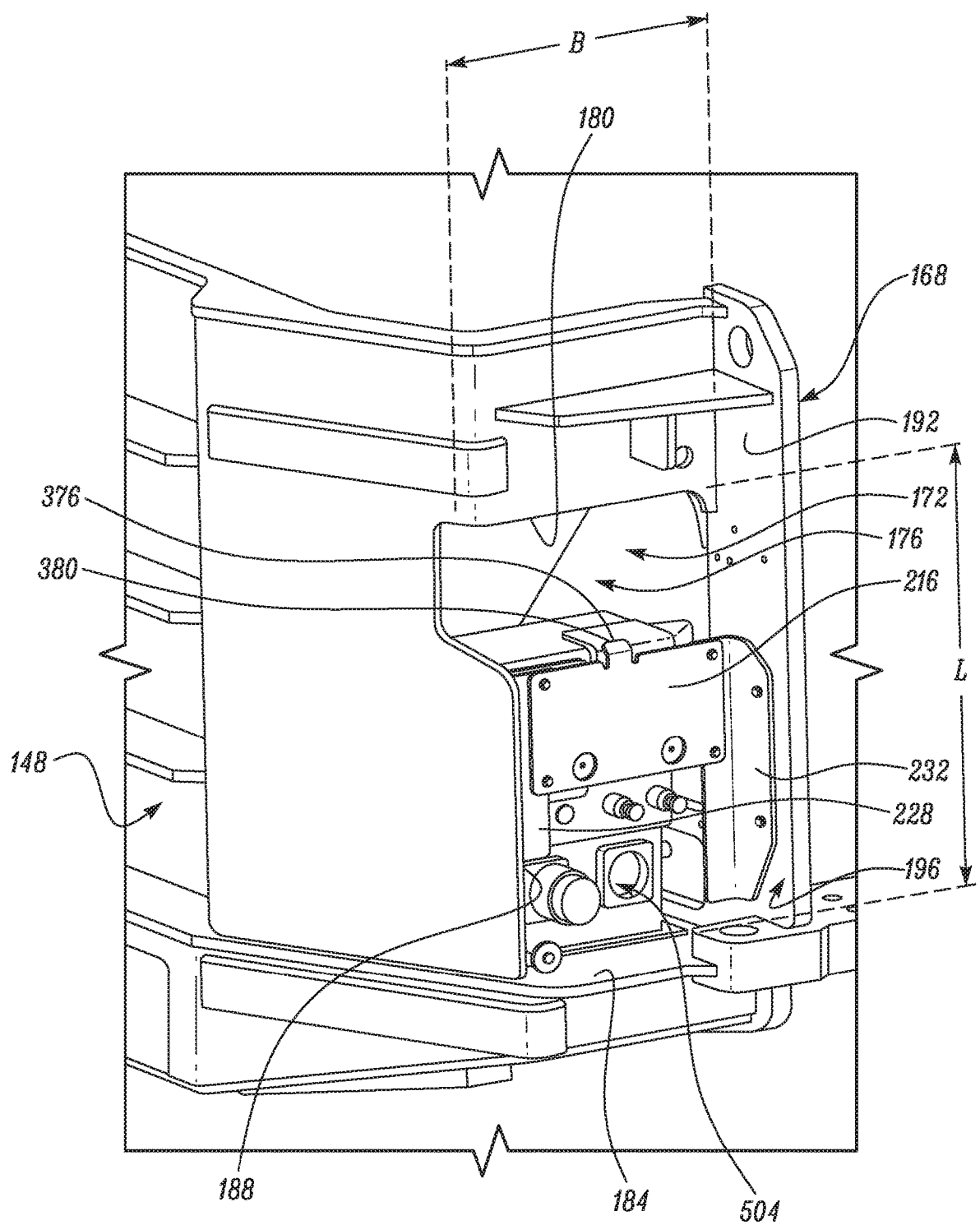
Figure 11:
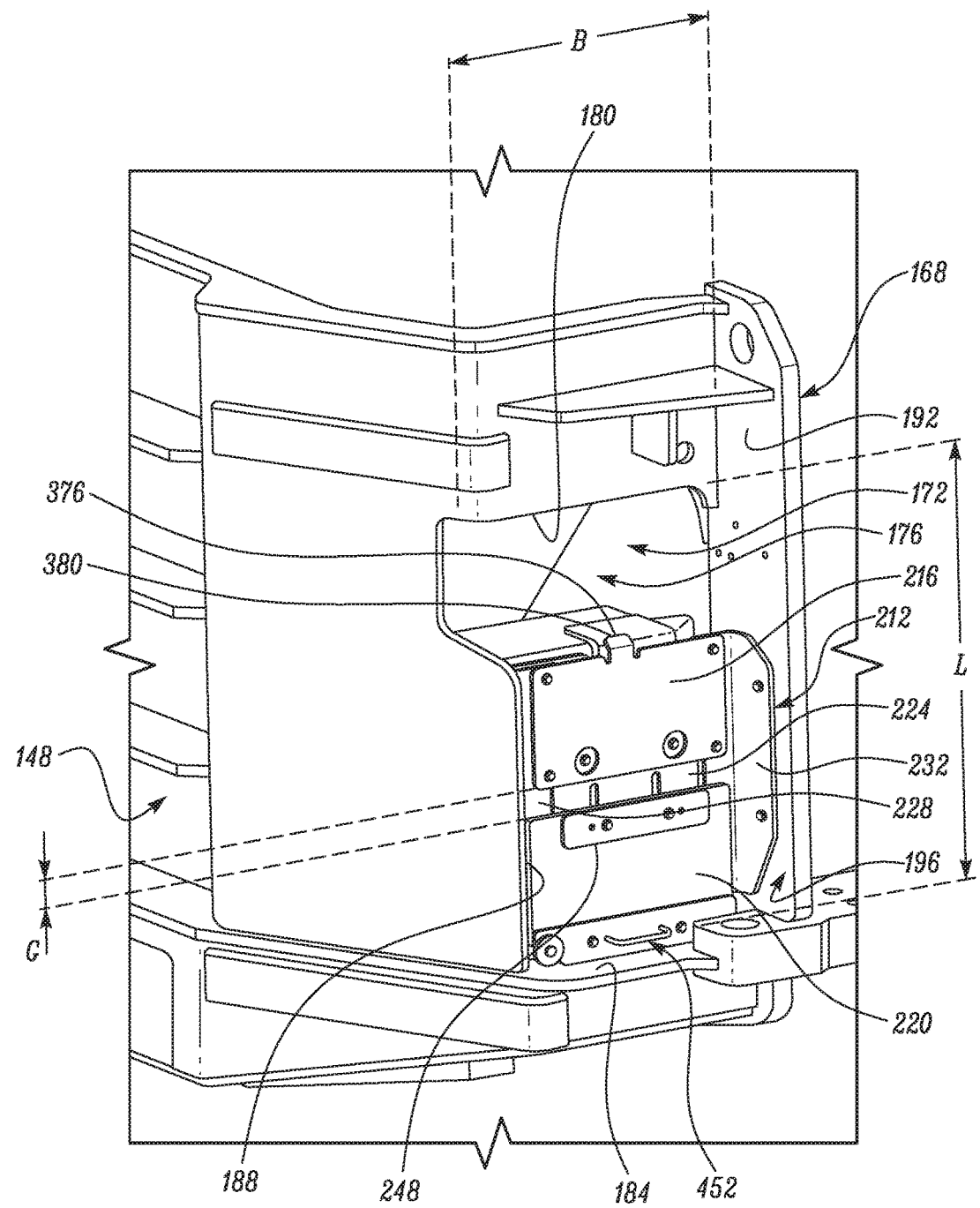

The power source 160 housed within the power compartment 144 of the machine 100 may include an electrical power source, such as a battery pack 200. The battery pack 200 may include or represent one or more batteries from which electrical power may be sourced to power and/or to accomplish one or more of the aforesaid functions of the machine 100. The battery pack 200 may include a charging port 204 (see FIG. 7) that may receive a charging plug or cable (not shown) from a power supply source (not shown), and by which the battery pack 200 may be suitably charged. In some embodiments, the charging port 204 is accessible from an outside 208 of the machine 100 through the opening 172. Although a single charging port (i.e., the charging port 204) of the battery pack 200 is shown and discussed, the charging port 204 may represent or embody multiple charging ports of the battery pack 200.

Figure 2:
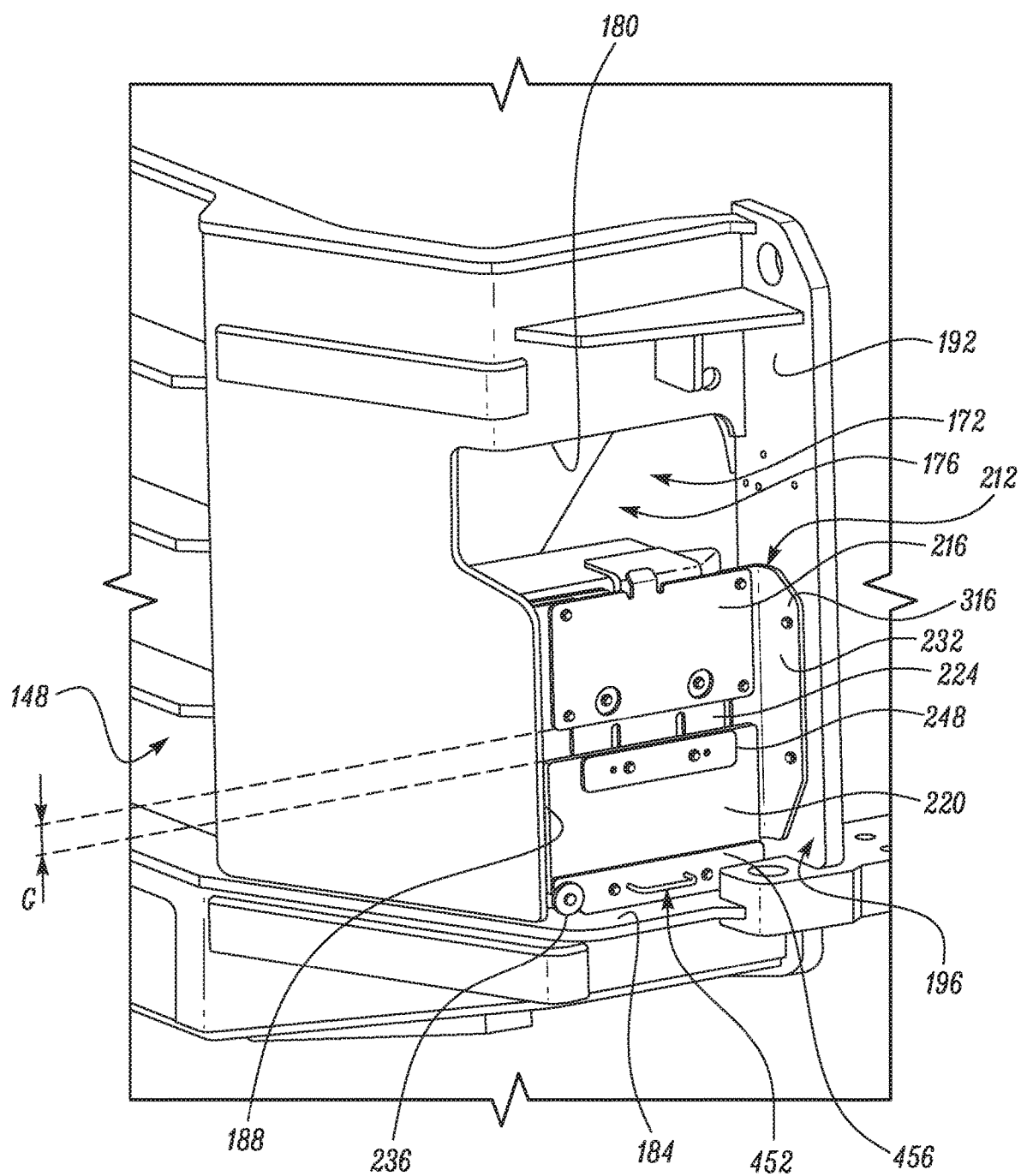
FIG. 2 is an enlarged view of a portion of the machine depicting the cover assembly of FIG. 1 in further detail, in accordance with an aspect of the present disclosure.
Figure 3:
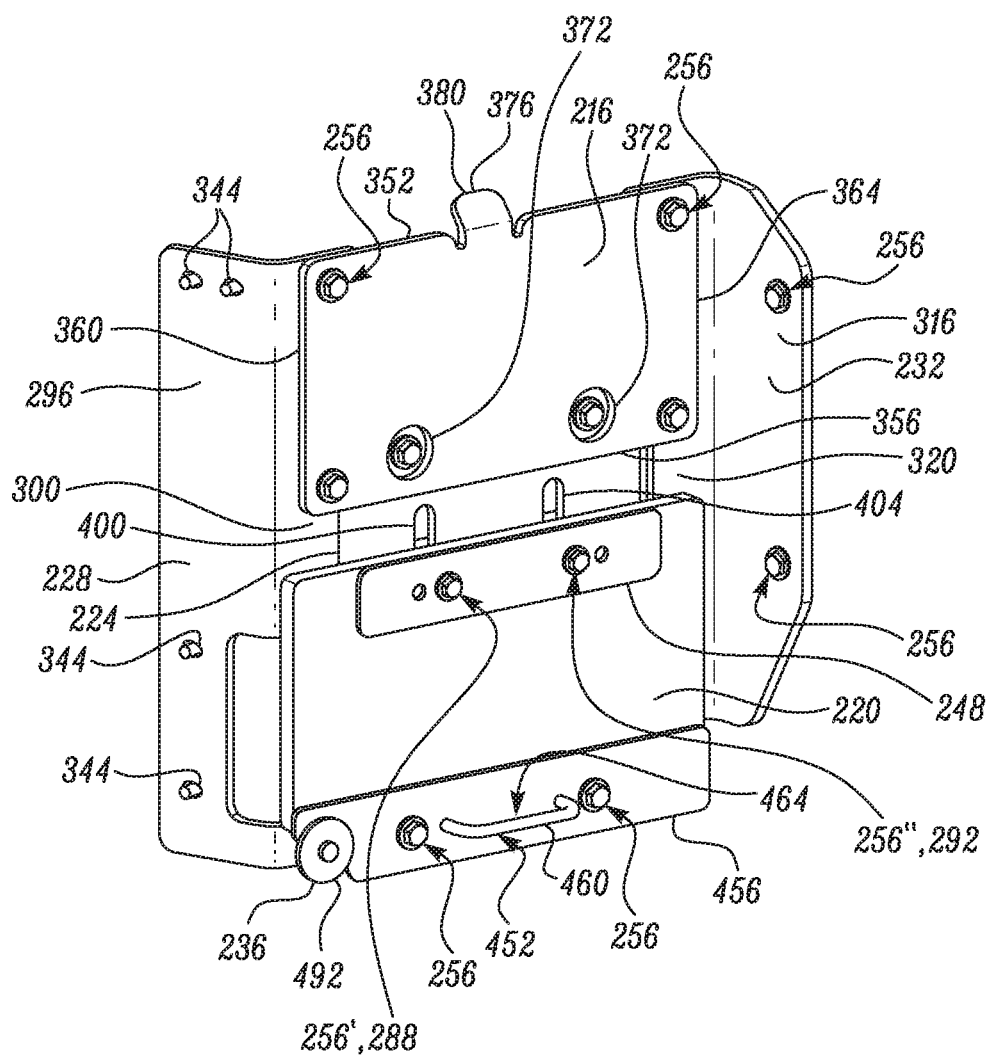
FIG. 3 is a perspective view of the cover assembly with one or more components around the cover assembly removed, in accordance with an aspect of the present disclosure.
Figure 4:
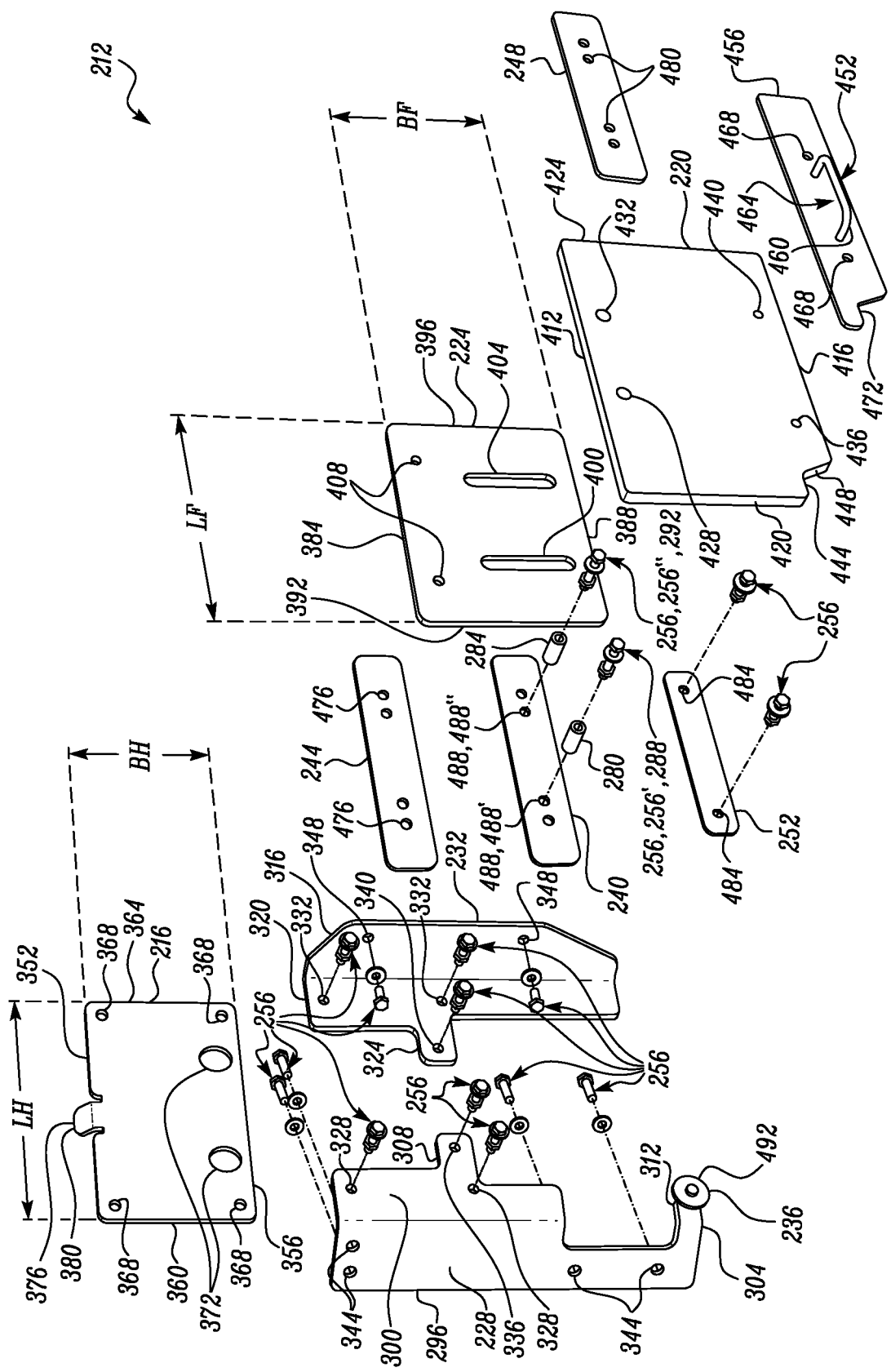
FIG. 4 is an exploded view of the cover assembly, in accordance with an aspect of the present disclosure.

Referring to FIGS. 2, 3, and 4, one or more aspects of the present disclosure relate to a cover assembly 212 for the charging port 204 of the battery pack 200 of the machine 100. The cover assembly 212 is arranged at the opening 172 and is adapted to provide selective access to the charging port 204 of the battery pack 200 through the opening 172. The cover assembly 212 includes a number of components, namely a head plate 216, a non-metallic base plate 220, and a flexible membrane 224. Further, the cover assembly 212 also includes a first side plate 228, a second side plate 232, a lock plate 236, a back plate 240, and a set of reinforcement plates. For example, the set of reinforcement plates includes a first reinforcement plate 244, a second reinforcement plate 248, and a third reinforcement plate 252.

Figure 5:
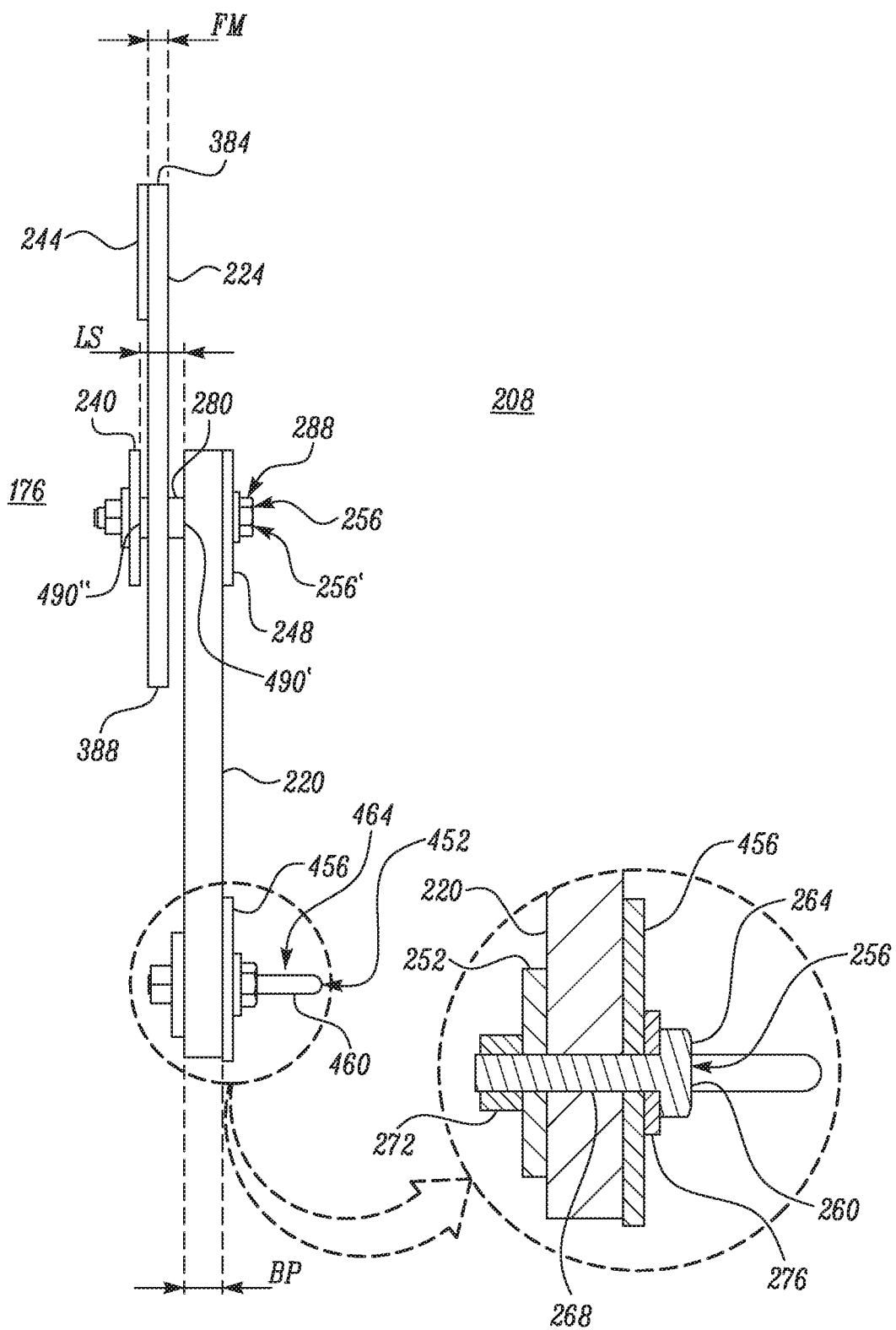
FIG. 5 is a view illustrating an assembly between two components of the cover assembly, in accordance with an aspect of the present disclosure.

Furthermore, the cover assembly 212 includes multiple fastener assemblies 256 using which various aforesaid components of the cover assembly 212 may be assembled. For simplicity, all fastener assemblies 256 may be referenced by the same reference numeral '256'. Each fastener assembly 256 may include various sub-parts. With exemplary reference to FIG. 5, an exemplary assembly between the non-metallic base plate 220 and the third reinforcement plate 252 is shown. While details related to such an assembly will be discussed later, a fastener assembly 256 may be seen to couple and retain the non-metallic base plate 220 with the third reinforcement plate 252. Said fastener assembly 256 includes a fastener 260, such as a bolt, having a head portion 264 and a shank portion 268, and a nut 272 that is coupled with the shank portion 268 so as to fasten and retain the non-metallic base plate 220 with the third reinforcement plate 252. Further, said fastener assembly 256 also includes a washer 276 that is applied between the head portion 264 and the non-metallic base plate 220. Each fastener assembly 256 may include similar set of sub-parts and may be able to couple two or more components or assembly of components of the cover assembly 212 with each other, in a manner similar to what is depicted in FIG. 5. Wherever required, same reference numerals may be applied for the various sub-parts of the fastener assemblies 256. Although the fastener assemblies 256 and/or its various sub-parts may be referenced by the same corresponding reference numerals, it is possible for one fastener assembly 256 to differ from another fastener assembly 256, e.g., in size and/or specification.

It may be noted that two of the fastener assemblies 256, i.e., a first fastener assembly 256' and a second fastener assembly 256" may be applied to couple and secure the non-metallic base plate 220 to the back plate 240. The first fastener assembly 256' and the second fastener assembly 256" respectively include a first sleeve 280 and a second sleeve 284 in addition to the sub-parts discussed above. The first sleeve 280 and the second sleeve 284 may help maintain a minimum distance between the back plate 240 and the non-metallic base plate 220 and may thus serve as spacers between the back plate 240 and the non-metallic base plate 220. The first sleeve 280 and the second sleeve 284 also help the first fastener assembly 256' and the second fastener assembly 256" correspondingly serve as guides that establish a slidable connection between the non-metallic base plate 220 and the flexible membrane 224. Therefore, the first fastener assembly 256' and the second fastener assembly 256" may be respectively referred to as a first guide 288 and a second guide 292, as well. All details related to the connection between the back plate 240 and the non-metallic base plate 220, the maintenance of the minimum distance between the back plate 240 and the non-metallic base plate 220, and the establishment of a slidable connection between the non-metallic base plate 220 and the flexible membrane 224, will be discussed later.

The first side plate 228 may define a first side plate portion 296, a first bent portion 300, and a strip piece portion 304. The first bent portion 300 may be bent away from the first side plate portion 296 at a first angle, as shown. For example, the first angle may be 90 degrees, although, in some cases, the first angle may range between 85-95 degrees. In some embodiments, the first angle may range between 70-110 degrees. A first strip plate 308 may extend from the first bent portion 300. As an example, the first strip plate 308 may extend in the same direction in which the first bent portion 300 extends from the first side plate portion 296. In other words, the first bent portion 300 and the first strip plate 308 may be co-planar.

The strip piece portion 304 may be spaced apart from the first bent portion 300. The strip piece portion 304 may also be bent away from the first side plate portion 296 at an angle that may be same as the first angle discussed above, although, depending upon factors such as spatial constraints, it is possible for the strip piece portion 304 to be bent away from the first side plate portion 296 at an angle that is different from the first angle. The strip piece portion 304 may extend away from the first side plate portion 296 to define an end 312 remote to the first side plate portion 296.

The second side plate 232 may define a second side plate portion 316 and a second bent portion 320. The second bent portion 320 may be bent away from the second side plate portion 316 at a second angle. For example, the second angle may be 90 degrees, although, in some cases, the second angle may range between 85-95 degrees. In some embodiments, the second angle may range between 70-110 degrees. A second strip plate 324 may extend from the second bent portion 320. As an example, the second strip plate 324 may extend in the same direction in which the second bent portion 320 extends from the second side plate portion 316. In other words, the second bent portion 320 and the second strip plate 324 may be co-planar.

Both the first bent portion 300 and the second bent portion 320 may respectively define a pair of through-slots. For example, the first bent portion 300 may define a first pair of through-slots 328 and the second bent portion 320 may include a second pair of through-slots 332. Further, the first strip plate 308 and the second strip plate 324 may also respectively define a first strip through-slot 336 and a second strip through-slot 340. Furthermore, the first side plate portion 296 and the second side plate portion 316 may also respectively include a first set of through-slots 344 and a second set of through-slots 348. As an example, the first set of through-slots 344 include four through-slots and the second set of through-slots 348 may include two through-slots, as shown.

The head plate 216 may be rectangular in shape and may define an upper edge 352, a lower edge 356, a first lateral side edge 360, and a second lateral side edge 364. Other shapes of the head plate 216, such as a square shape of the head plate 216, is possible. The upper edge 352 and the lower edge 356 may extend along a length, LH, of the head plate 216, while the first lateral side edge 360 and the second lateral side edge 364 may extend along a breadth, BH, of the head plate 216. The upper edge 352 and the lower edge 356 may meet the first lateral side edge 360 and the second lateral side edge 364 to define corners of the head plate 216—given the exemplary rectangular shape of the head plate 216, four corners of the head plate 216 may be defined.

The head plate 216 may also define slots passing therethrough, for example, the head plate 216 includes a first set of slots 368, with the slots of the first set of slots 368 being respectively arranged at (or close) to the corners defined by the head plate 216—given the four corners, the first set of slots 368 may include four slots. As an example, the head plate 216 include two slots of the first set of slots 368 disposed at the first lateral side edge 360 and two slots of the first set of slots 368 disposed at the second lateral side edge 364. The head plate 216 also includes a second set of slots 372, with the slots of the second set of slots 372 being arranged at (or close) to the lower edge 356 of the head plate 216. Exemplarily, the second set of slots 372 may include two slots.

Further, the head plate 216 defines an engagement member 376. The engagement member 376 may include a hook 380 that may extend upwards and away from the upper edge 352 of the head plate 216, as shown. Although not limited, the head plate 216 and the hook 380 may be integrally formed and may be made from the same material, such as a metallic material or an alloy. In some embodiments, the head plate 216 and the hook 380 may be formed by way of a single shearing operation executed over a piece of sheet metal.

The flexible membrane 224 may be able to flex and bend under an application of force. The flexible membrane 224 may include a rectangular shape, as well, although the flexible membrane 224 may include other shapes, such as a square shape. The flexible membrane 224 defines an upper membrane edge 384, a lower membrane edge 388, and side membrane edges (e.g., a first side membrane edge 392 and a second side membrane edge 396) that extend between the upper membrane edge 384 and the lower membrane edge 388. As an example, the upper membrane edge 384 and the lower membrane edge 388 are defined along a length, LF, of the flexible membrane 224, while the first side membrane edge 392 and the second side membrane edge 396 are defined along a breadth, BF, of the flexible membrane 224.

The flexible membrane 224 defines one or more longitudinal slots. As an example, the flexible membrane 224 includes two longitudinal slots, namely, a first longitudinal slot 400 and a second longitudinal slot 404. Additional longitudinal slots may be contemplated. The first longitudinal slot 400 and the second longitudinal slot 404 may extend and/or be disposed in the same direction, and may be defined along the breadth, BF, of the flexible membrane 224. Further, the flexible membrane 224 may also define a pair of through-holes 408 disposed at (or close to) the upper membrane edge 384. The flexible membrane 224 may be made from rubber and/or a polymer, although variety of other flexible materials, such as an elastomeric material, types of fiber, and the like, may be used either alone, or in combination with each other, or in combination with rubber and/or a polymer, to form the flexible membrane 224. Further, the flexible membrane 224 may define a thickness, FM (see FIG. 5).

The non-metallic base plate 220 may include a rectangular shape, and may define an upper plate edge 412, a lower plate edge 416, a left side edge 420, and a right side edge 424. The non-metallic base plate 220 includes a pair of upper apertures (i.e., a first aperture 428 and a second aperture 432) disposed at (or close to) the upper plate edge 412 and a pair of lower apertures (i.e., a third aperture 436 and a fourth aperture 440) disposed at (or close to) the lower plate edge 416. According to an aspect of the present disclosure, the non-metallic base plate 220 includes an indentation 444, and as shown, the indentation 444 defines a mating surface 448 that extends between the lower plate edge 416 and the left side edge 420 of the non-metallic base plate 220 as an interface between the lower plate edge 416 and the left side edge 420. The non-metallic base plate 220 defines a thickness, BP (see FIG. 5). In some embodiments, the thickness, BP, is larger than the thickness, FM, of the flexible membrane 224. In some embodiments, the non-metallic base plate 220 is made from nylon reinforced rubber and may possess a rigidity and strength that is higher than a rigidity and strength possessed by the flexible membrane 224, but may be deformable under the application of external force and may have the ability to re-acquire its original shape and form.

Further, the non-metallic base plate 220 may define a coupling member 452. The coupling member 452 may include a plate section 456. Although not limited, the plate section 456 may be similar (e.g., in profile and/or specification) to the first reinforcement plate 244, the second reinforcement plate 248, the third reinforcement plate 252, and the back plate 240 (details related to the first reinforcement plate 244, the second reinforcement plate 248, the third reinforcement plate 252, and the back plate 240 have been discussed below). The coupling member 452 may also include a handle 460 that may be coupled (e.g., fixedly) to the plate section 456 and may define a recess 464. The plate section 456 may also include a pair of holes 468.

The coupling member 452 is configured to be coupled to the non-metallic base plate 220, and, in some embodiments, the plate section 456 may include a cutout 472 that may include a profile similar to a profile of the indentation 444 so as to compliment the indentation 444 as the plate section 456 may lie in registration and abutment with the non-metallic base plate 220. In such a case, the mating surface 448 may be defined in conjunction by both the indentation 444 defined by the non-metallic base plate 220 and the cutout 472 defined by the plate section 456 of the coupling member 452.

Each of the first reinforcement plate 244, the second reinforcement plate 248, and the third reinforcement plate 252 may include an elongated profile, as shown. As with the plate section 456, each of the first reinforcement plate 244, the second reinforcement plate 248, and the third reinforcement plate 252, may also include a pair of holes. For example, the first reinforcement plate 244 includes a first pair of holes 476, the second reinforcement plate 248 includes a second pair of holes 480, and the third reinforcement plate 252 includes a third pair of holes 484. For ease in reference and understanding, the pair of holes 468 of the plate section 456, as noted above, may be referred to as a fourth pair of holes 468, hereinafter.

The back plate 240 may be similar in shape and configuration to each of the first reinforcement plate 244, the second reinforcement plate 248, and the third reinforcement plate 252, and may include a fifth pair of holes 488 (e.g., a first hole 488' and a second hole 488"). Although not limited, each of the back plate 240, the first reinforcement plate 244, the second reinforcement plate 248, and the third reinforcement plate 252, may be made from a metallic material or may be made from an alloy. While it is possible for the profiles and specification (e.g., dimensions and materials) of the back plate 240, the first reinforcement plate 244, the second reinforcement plate 248, and the third reinforcement plate 252, all remain similar to each other, some applications may warrant one or more of the profiles and specification associated with one or more of the back plate 240, the first reinforcement plate 244, the second reinforcement plate 248, the third reinforcement plate 252, to differ from one or more of the other of the back plate 240, the first reinforcement plate 244, the second reinforcement plate 248, and the third reinforcement plate 252.

The various slots and through-slots (such as the first pair of through-slots 328), holes and through-holes (such as pair of through-holes 408), and the apertures (such as first aperture 428), discussed above may include a circular cross-section. It is however possible for such slots and through-slots, holes and through-holes, and the apertures, to include an elliptical cross-section or an oblong cross-section, as well. An elliptical cross-section or an oblong cross-section may allow fasteners from the fastener assemblies 256 to easily pass through such slots, holes, and apertures, allowing the associated components, that are being assembled together, to be aligned properly to each other.

Figure 6:
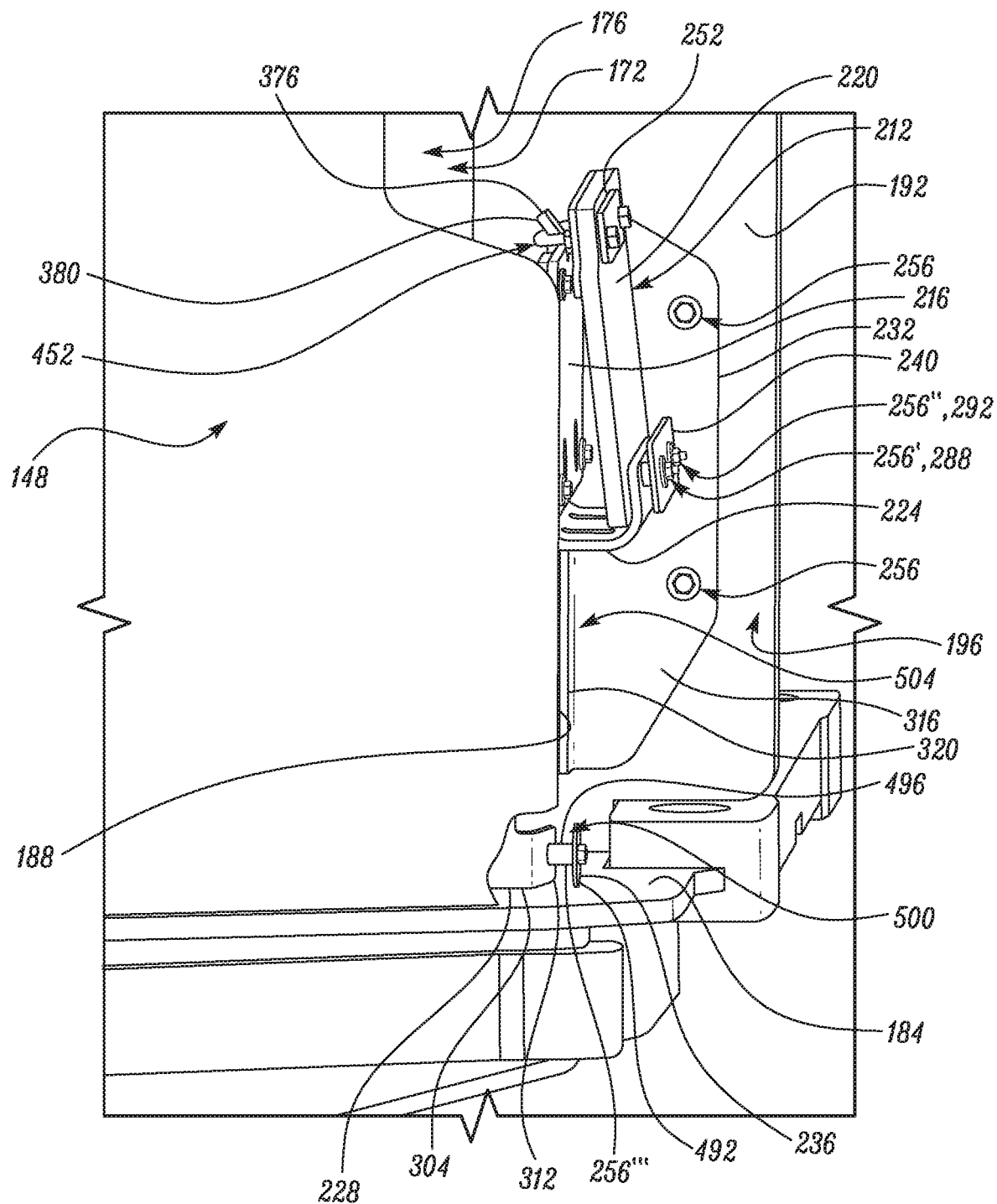
FIG. 6 is a view in which a non-metallic base plate of the cover assembly is moved to a folded state to open an aperture to access the charging port through the aperture, in accordance with an aspect of the present disclosure.

Referring to FIGS. 4 and 6, the lock plate 236 may include a disc 492. The lock plate 236 may be coupled to the end 312 defined by the strip piece portion 304 of the first side plate 228. In one embodiment, the lock plate 236 is coupled to the end 312 defined by the strip piece portion 304 by way of a fastener assembly 256''' (referred to as a third fastener assembly 256''') (similar to the fastener assemblies 256', 256"), and accordingly may include a third sleeve 496 (similar to the first sleeve 280 and the second sleeve 284) that may help maintain a minimum distance between the end 312 and the lock plate 236. The minimum distance defined between the lock plate 236 and the end 312 of the strip piece portion 304 defines a groove 500 between the lock plate 236 and the end 312 of the strip piece portion 304.

INDUSTRIAL APPLICABILITY

Referring to FIGS. 7 to 11, an exemplary assembly process associated with assembling the cover assembly 212 at the opening 172 has been discussed. During the exemplary assembly process, an operator may first bring forth the first side plate 228 towards the first side 188 of the inner periphery 196 of the opening 172, and may cause the first side plate portion 296 of the first side plate 228 to abut and rest against the first side 188 of the opening 172. Thereafter, the operator may insert four fasteners (of four fastener assemblies 256) through the first set of through-slots 344. The remaining sub-parts of the four fastener assemblies 256 may then be used to fasten the fastener and assemble the first side plate portion 296 (and thus the first side plate 228) to the first side 188 of the opening 172.

Next, the operator may bring forth the second side plate 232 towards the second side 192 of the inner periphery 196 of the opening 172, and may cause the second side plate portion 316 of the second side plate 232 to abut and rest against the second side 192 of the opening 172. Thereafter, the operator may insert two fasteners of two fastener assemblies 256 through the second set of through-slots 348. The remaining sub-parts of the two fastener assemblies 256 may then be used to fasten the fastener and assemble the second side plate portion 316 (and thus the second side plate 232) to the second side 192 of the opening 172. In that manner, the first side plate 228 is coupled to the first side 188 and the second side plate 232 coupled to the second side 192. In the assembled state of the first side plate 228 and the second side plate 232 respectively with the first side 188 and the second side 192, the first strip plate 308 and the second strip plate 324 may be in line with each other and also may be directed towards each other.

Once the first side plate 228 and the second side plate 232 have been respectively assembled to the first side 188 and the second side 192, an operator may bring forth the head plate 216 for assembly to the first side plate 228 and the second side plate 232. In this regard, the operator may align two slots of the first set of slots 368 disposed at the first lateral side edge 360 of the head plate 216 with the first pair of through-slots 328 of the first side plate 228 and align two slots (i.e., two remaining slots) of the first set of slots 368 disposed at the second lateral side edge 364 of the head plate 216 with the second pair of through-slots 332 of the second side plate 232. Thereafter, fasteners from four fastener assemblies 256 may be inserted and driven through the aligned through-slot—slot junctions thus formed and various sub-parts (including nuts and washers) of those fastener assemblies 256 may be used to fasten the fastener and assemble the first lateral side edge 360 of the head plate 216 to the first side plate 228 and the second lateral side edge 364 of the head plate 216 to the second side plate 232.

Figure 12:
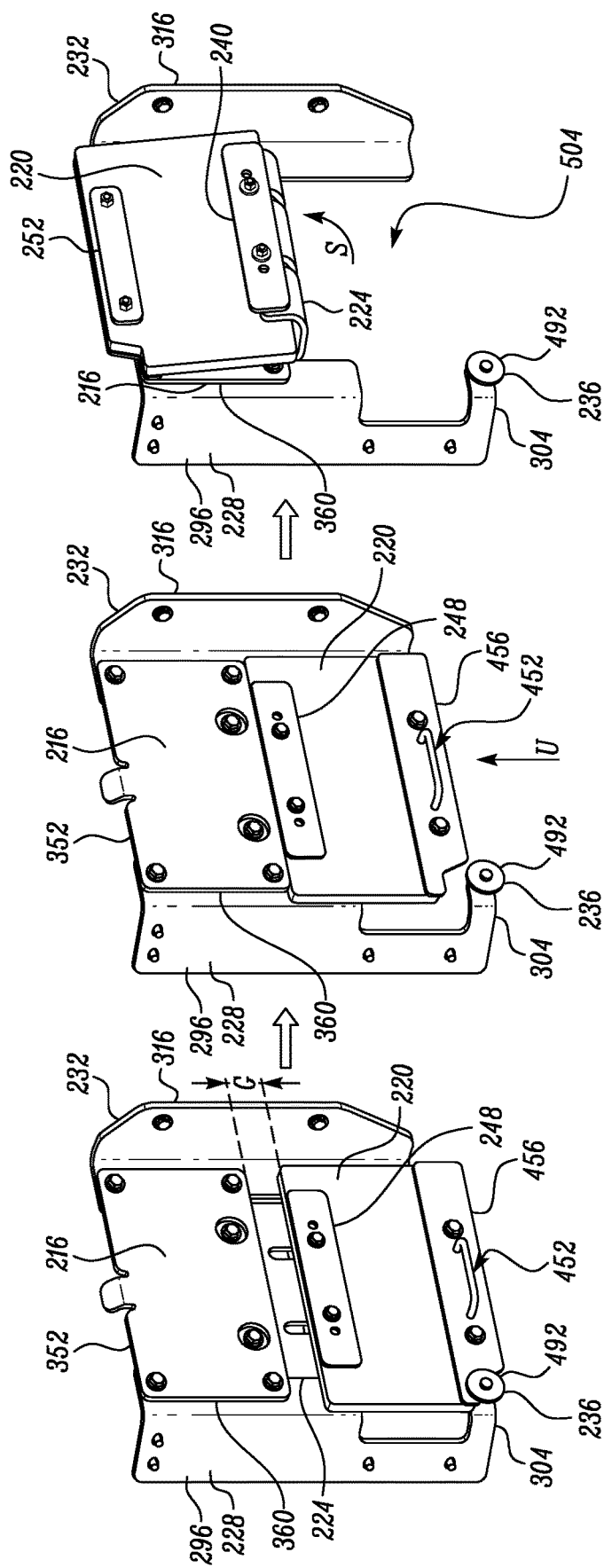
FIG. 12 is a view illustrating an opening sequence of the cover assembly, in accordance with an aspect of the present disclosure.

In that manner, the head plate 216 may be coupled to each of the first side plate 228 and the second side plate 232 and spans therebetween to extend across the opening 172, and, in so doing, the head plate 216 is coupled to the outer panel assembly 168 of the machine 100 and extends across the opening 172 of the outer panel assembly 168 to define an aperture 504 (best visualized in FIGS. 6, 10, and 12) with a portion of the opening 172. It may be noted that in the assembled state of the head plate 216 with the first side plate 228 and the second side plate 232, the second set of slots 372 may also align with the first strip through-slot 336 and the second strip through-slot 340, as shown.

Thereafter, the operator may insert a group comprising the first reinforcement plate 244 and the flexible membrane 224 into the aperture 504 and may align and hold the group against the first strip plate 308 and the second strip plate 324 from an inside of the opening 172 in a direction towards the outside 208, such that said group may rest against the first strip plate 308 and the second strip plate 324 from the inside of the opening 172. Also, in so doing, the operator may ensure that the first pair of holes 476 of the first reinforcement plate 244, the pair of through-holes 408 of the flexible membrane 224, may correspondingly align with the first strip through-slot 336 and the second strip through-slot 340 of the first strip plate 308 and the second strip plate 324. In so doing, the first pair of holes 476 of the first reinforcement plate 244 and the pair of through-holes 408 of the flexible membrane 224 also align with the second set of slots 372 of the head plate 216.

With the alignment of the first pair of holes 476 with each of the pair of through-holes 408, and the first strip through-slot 336 and the second strip through-slot 340, and the second set of slots 372, dual passages for fastener insertion may be defined. The operator may then correspondingly insert and/or drive two fasteners from two fastener assemblies 256 into the two passages, and then various sub-parts (including nuts, etc.) of those fastener assemblies 256 may be used to fasten the fastener and assemble the back plate 240, the flexible membrane 224, the first strip plate 308, and the second strip plate 324, together. In that manner, the flexible membrane 224 is fixedly coupled to the head plate 216. In some embodiments, the second set of slots 372 of the head plate 216 may only serve as cavities through which a tool (not shown) may be inserted to tighten the two fasteners of the fastener assemblies 256 such that the back plate 240, the flexible membrane 224, the first strip plate 308, and the second strip plate 324, may be all clubbed and immovably fastened together. An order of arrangement between the aforesaid components may be as follows: the head plate 216—the first strip plate 308 and the second strip plate 324—the flexible membrane 224—the first reinforcement plate 244, in a direction that extends from the rearward end 132 of the machine 100 towards the forward end 128 of the machine 100.

As a next step of the assembly process, the operator may bring forth the non-metallic base plate 220 and may align the first aperture 428 and the second aperture 432 of the non-metallic base plate 220 correspondingly with portions of the first longitudinal slot 400 and the second longitudinal slot 404 of the flexible membrane 224. Further, the operator may also insert the back plate 240 into the aperture 504 and line up the back plate 240 with the flexible membrane 224 so as to align the fifth pair of holes 488 (i.e., the first hole 488' and second hole 488") correspondingly with the first longitudinal slot 400 and the second longitudinal slot 404 of the flexible membrane 224. At this point, the flexible membrane 224 may acquire a position in between the non-metallic base plate 220 and the back plate 240, and may be arranged according to the following order: non-metallic base plate 220—flexible membrane 224—back plate 240, in a direction that extends from the rearward end 132 of the machine 100 towards the forward end 128 of the machine 100. Thereafter, the operator may use the first fastener assembly 256' and the second fastener assembly 256" to couple the non-metallic base plate 220 to the flexible membrane 224 such that the flexible membrane 224 is slidably engaged with the non-metallic base plate 220.

With regard to such an exemplary coupling, and with reference to FIGS. 4 and 5, the operator may first insert the first sleeve 280 through the first longitudinal slot 400. Thereafter, the operator may bring forth the non-metallic base plate 220 to abut and align the first aperture 428 of the non-metallic base plate 220 and the first hole 488' of the back plate 240 correspondingly with either ends 490', 490" of the first sleeve 280 such that the back plate 240 may acquire a position towards the interior 176 of the power compartment 144 and the non-metallic base plate 220 may acquire a position towards the outside 208 of the machine 100. The operator may then insert the shank portion of a fastener associated with the first fastener assembly 256' into the first sleeve 280 (e.g., in a direction from the outside 208 of the machine 100 towards the interior 176 of the power compartment 144) such that the head portion of said fastener may abut and contact the non-metallic base plate 220, while (an end portion of) the shank portion of said fastener may extend out from an opposite end of the first sleeve 280. In such process, the operator may ensure that (an end portion of) the shank portion may also pass through and extend out of the first hole 488' of the fifth pair of holes 488 of the back plate 240, but at the same time, may also ensure that the opposite end of the first sleeve 280 also abuts the back plate 240, thereby causing the back plate 240 to be spaced apart from the non-metallic base plate 220 at least by a minimum distance (e.g., that may equal a length, LS, of the first sleeve 280) (see FIG. 5). The minimum distance as formed may define an intermediate space between the back plate 240 and the non-metallic base plate 220 allowing the flexible membrane 224 to be slidably accommodated therebetween—this arrangement is best visualized in FIG. 5. It may be noted that the minimum distance as formed by the length, LS, defining the intermediate space, may be larger than the thickness, FM, defined by the flexible membrane 224.

The operator may use the remainder of the sub-parts (such as nuts, etc.) of the first fastener assembly 256' to tighten the corresponding fastener, and, in turn, attain an assembly in which the non-metallic base plate 220, the first fastener assembly 256', and the back plate 240 are all coupled (e.g., fixedly) to each other. In such a process, the flexible membrane 224 is retained in slidable engagement between the non-metallic base plate 220 and the back plate 240 with the first longitudinal slot 400 receiving the first sleeve 280. As a result, the first sleeve 280 may be retained in the first longitudinal slot 400 to engage and cooperate with the first longitudinal slot 400 so as to also slide and be guided along a length of the first longitudinal slot 400. Accordingly, the first fastener assembly 256' may form the first guide 288 that establishes a slidable connection between the non-metallic base plate 220 and the flexible membrane 224.

In the above exemplary coupling process, before inserting the fastener (associated with the first fastener assembly 256') into the first sleeve 280, the operator may place and align the second reinforcement plate 248 with the non-metallic base plate 220 such that the second pair of holes 480 of the second reinforcement plate 248 may correspondingly align with the first aperture 428 and the second aperture 432 of the non-metallic base plate 220. In that manner, the operator may ensure that the second reinforcement plate 248 may acquire a position in between the head portion of said fastener (of the first fastener assembly 256') and the non-metallic base plate 220. In such a case, the head portion of the fastener (associated with the first fastener assembly 256') may abut and contact the second reinforcement plate 248 (see FIG. 5) instead of abutting and contacting the non-metallic base plate 220.

An assembly (and function) of the second fastener assembly 256" with respect to the second aperture 432 of the non-metallic base plate 220, the second longitudinal slot 404 of the flexible membrane 224, and the second hole 488" of the fifth pair of holes 488 of the back plate 240, may remain similar to the assembly (and function) of the first fastener assembly 256' to the first aperture 428 of the non-metallic base plate 220, the first longitudinal slot 400 of the flexible membrane 224, and the first hole 488' of the fifth pair of holes 488 of the back plate 240, as has been discussed above. Therefore, an assembly (and function) of the second fastener assembly 256" with respect to the second aperture 432 of the non-metallic base plate 220, the second longitudinal slot 404 of the flexible membrane 224, and the second hole 488" of the fifth pair of holes 488 of the back plate 240, is not discussed.

By way of the exemplary coupling process discussed above, the non-metallic base plate 220 may be coupled (e.g., fixedly) to the first fastener assembly 256' and the second fastener assembly 256" (or to the first guide 288 and the second guide 292) and to the back plate 240, and is correspondingly engaged with the first longitudinal slot 400 and the second longitudinal slot 404 of the flexible membrane 224 to cooperate with the first longitudinal slot 400 and the second longitudinal slot 404 of the flexible membrane 224 and attain a slidable engagement with respect to the head plate 216.

The operator may further couple the coupling member 452 to the non-metallic base plate 220 by bringing in the plate section 456 of the coupling member 452 to abut against the non-metallic base plate 220 such that the fourth pair of holes 468 of the plate section 456 may correspondingly align with the third aperture 436 and the fourth aperture 440 of the non-metallic base plate 220. The operator may then line up the third reinforcement plate 252 with the non-metallic base plate 220 such that the third pair of holes 484 of the third reinforcement plate 252 may correspondingly align with the third aperture 436 and the fourth aperture 440 of the non-metallic base plate 220. The non-metallic base plate 220, at this point, may acquire a position in between the coupling member 452 and the third reinforcement plate 252, with the coupling member 452 facing the outside 208 and the third reinforcement plate 252 facing the interior 176.

The operator may then correspondingly insert and/or drive two fasteners from two fastener assemblies 256 into corresponding passages defined by the fourth pair of holes 468, the apertures 436, 440, and the third pair of holes 484. Various sub-parts (including nuts, etc.) of those fastener assemblies 256 may be used to fasten the fastener and assemble the plate section 456 (and thus the coupling member 452) to the non-metallic base plate 220.

Although the aforesaid assembly process is discussed, it may be contemplated that, in some cases, the operator may first assemble the non-metallic base plate 220 with the flexible membrane 224 before assembling the flexible membrane 224 to the head plate 216. In some cases, it is possible for one or more of the other components of the cover assembly 212, or for the cover assembly 212, as a whole, to be assembled first before being assembly to the inner periphery 196 of the opening 172. Accordingly, it may be noted that the foregoing assembly process, discussing a sequence of assembling the cover assembly 212 to the inner periphery 196 of the opening 172 with reference to the FIGS. 7 to 11, is purely exemplary.

Given the flexible membrane 224 in the aforementioned assembly, the non-metallic base plate 220 is movable with respect to the head plate 216 to selectively open and close the aperture 504. For example, the flexibility offered by the flexible membrane 224 helps the non-metallic base plate 220 flex and move between a folded state and an unfolded state with respect to the head plate 216. In the unfolded state, the non-metallic base plate 220 may close the aperture 504, and, in the folded state, the non-metallic base plate 220 may open the aperture 504 to allow access to the charging port 204 from the outside 208 of the machine 100, through the aperture 504. Further, in the unfolded state (i.e., when the aperture 504 is closed), the mating surface 448 of the non-metallic base plate 220 is configured to be received into the groove 500 to be engaged with the lock plate 236 and so that the non-metallic base plate 220 is retained in the unfolded state to cover and shield the aperture 504. Also, given the slidable engagement of the non-metallic base plate 220 with respect to the head plate 216, in the unfolded state (i.e., when the aperture 504 is closed) the non-metallic base plate 220 may be slid and spaced apart from the head plate 216 to define a gap, G, therebetween (see FIGS. 2, 11, and 12).

The forthcoming disclosure discusses an exemplary opening sequence of the cover assembly 212 involving the movement of the non-metallic base plate 220 from the closed state to the open state. The opening sequence is discussed in conjunction with FIG. 12. At the start of the opening sequence, an operator may grab the handle 460 and may lift the non-metallic base plate 220 (see direction, U) such that the non-metallic base plate 220 may slide and move towards the head plate 216. In process of the non-metallic base plate 220 moving towards the head plate 216, the mating surface 448 may slide out and disengage from the groove 500. In some cases, the operator may continue to slide the non-metallic base plate 220 until the gap, G, defined between the non-metallic base plate 220 and the head plate 216 in the unfolded state, closes or comes to a minimum. Once the non-metallic base plate 220 is appropriately lifted and disengaged from the lock plate 236, the operator may swing the non-metallic base plate 220 (see direction, S) all the way up to the folded state. In the folded state, the operator may engage the engagement member 376 with the coupling member 452. More particularly, operator may engage the handle 460 with the hook 380 such that the recess 464 defined by the handle 460 may receive the hook 380. A closing sequence of the cover assembly 212 may be contemplated in reverse to the opening sequence, as has been discussed above.

An absence of the cover assembly 212 may cause the charging port 204 to be exposed to the outside 208 of the machine 100 and remain vulnerable to interference from features and elements that may be present at a site in which the machine 100 may operate or be stationed. By way of having the cover assembly 212 at the opening 172, the charging port 204 is appropriately shielded and protected from such interference, thus helping the charging port 204 retain its integrity and functionality. Also, since the non-metallic base plate 220 and the flexible membrane 224 is constructed from a non-metallic material, such as a polymer, nylon reinforced rubber, etc., the non-metallic base plate 220 and the flexible membrane 224 is able absorb an impact energy in the event of an interference, without being permanently deformed. Moreover, the non-metallic base plate 220 and the flexible membrane 224 can return to their original state or their flat form after an impact or after an interfering feature is removed—which is not possible had materials, such as steel, were used to cover the aperture 504. The ability for the non-metallic base plate 220 and the flexible membrane 224 to return to its original shape and form helps operators retain access to the charging port 204 even after an impact. Apart from being easily manipulatable and being resistant to damage, the flexible membrane 224 and the non-metallic base plate 220 also serve as a corrosion free cover and shield for the charging port 204.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A cover assembly for a charging port of an electric machine, the cover assembly comprising:
    a head plate coupled to an outer panel assembly of the electric machine, the head plate extending across an opening of the outer panel assembly to define an aperture with a portion of the opening;
    a non-metallic base plate movable with respect to the head plate to selectively open and close the aperture; and
    a flexible membrane fixedly coupled to one of the head plate or the non-metallic base plate and slidably engaged to the other of the head plate or the non-metallic base plate to enable the non-metallic base plate to slide with respect to the head plate and move between a folded state and an unfolded state with respect to the head plate, wherein
        in the unfolded state, the non-metallic base plate closes the aperture, and, in the folded state, the non-metallic base plate opens the aperture to allow access to the charging port from an outside of the electric machine through the aperture.

2. The cover assembly of claim 1, wherein the head plate defines an engagement member and the non-metallic base plate defines a coupling member, wherein, in the folded state, the engagement member is configured to be engaged with the coupling member.

3. The cover assembly of claim 2, wherein the engagement member includes a hook and the coupling member includes a handle defining a recess, the hook being received in the recess to be engaged thereto.

4. The cover assembly of claim 1, wherein the opening defines an inner periphery including a first side and a second side, the first side being spaced apart from the second side to define the opening therebetween, the cover assembly including a first side plate coupled to the first side and a second side plate coupled to the second side, wherein
    the head plate is coupled to each of the first side plate and the second side plate and spans therebetween to extend across the opening.

5. The cover assembly of claim 4 further including a lock plate spaced apart from a portion of the first side plate and defining a groove therebetween, the non-metallic base plate including a mating surface configured to be received into the groove to retain the non-metallic base plate in the unfolded state to cover the aperture.

6. The cover assembly of claim 1 further including one or more guides, wherein the flexible membrane includes one or more longitudinal slots configured to slidably receive the one or more guides, one of the head plate or the non-metallic base plate being coupled to the one or more guides to slidably engage and cooperate with the one or more longitudinal slots and be slidably engaged with the other of the head plate or the non-metallic base plate.

7. The cover assembly of claim 6 further including a back plate fixedly coupled to the one or more guides to retain one of the head plate or the non-metallic base plate with the flexible membrane,
    wherein the back plate is spaced apart from one of the head plate or the non-metallic base plate to define an intermediate space therebetween to slidably accommodate the flexible membrane therebetween.

8. The electric machine of claim 1, wherein the non-metallic base plate is made from nylon reinforced rubber.

9. The electric machine of claim 1, wherein the flexible membrane is made from rubber or a polymer.

10. The electric machine of claim 1, wherein the head plate is made from one of a metal or an alloy.

11. An electric machine, comprising:
a charging port;
an outer panel assembly defining an opening;
a cover assembly for the charging port, the cover assembly including:
  a head plate coupled to the outer panel assembly and extending across the opening to define an aperture with a portion of the opening;
  a non-metallic base plate movable with respect to the head plate to selectively open and close the aperture; and
  a flexible membrane fixedly coupled to one of the head plate or the non-metallic base plate and slidably engaged to the other of the head plate or the non-metallic base plate to enable the non-metallic base plate to slide with respect to the head plate and move between a folded state and an unfolded state with respect to the head plate, wherein
    in the unfolded state, the non-metallic base plate closes the aperture, and, in the folded state, the non-metallic base plate opens the aperture to allow access to the charging port from an outside of the electric machine through the aperture.

12. The electric machine of claim 11, wherein the head plate defines an engagement member and the non-metallic base plate defines a coupling member, wherein, in the folded state, the engagement member is configured to be engaged with the coupling member.

13. The electric machine of claim 12, wherein the engagement member includes a hook and the coupling member includes a handle defining a recess, the hook being received in the recess to be engaged thereto.

14. The electric machine of claim 11, wherein the opening defines an inner periphery including a first side and a second side, the first side being spaced apart from the second side to define the opening therebetween, the cover assembly including a first side plate coupled to the first side and a second side plate coupled to the second side, wherein
the head plate is coupled to each of the first side plate and the second side plate and spans therebetween to extend across the opening.

15. The electric machine of claim 14, wherein the cover assembly includes a lock plate spaced apart from a portion of the first side plate and defining a groove therebetween, the non-metallic base plate including a mating surface configured to be received into the groove to retain the non-metallic base plate in the unfolded state to cover the aperture.

16. The electric machine of claim 11 further including one or more guides, wherein the flexible membrane includes one or more longitudinal slots configured to slidably receive the one or more guides, one of the head plate or the non-metallic base plate being coupled to the one or more guides to slidably engage and cooperate with the one or more longitudinal slots and be slidably engaged with the other of the head plate or the non-metallic base plate.

17. The electric machine of claim 16, wherein the cover assembly includes a back plate fixedly coupled to the one or more guides to retain one of the head plate or the non-metallic base plate with the flexible membrane,
wherein the back plate is spaced apart from one of the head plate or the non-metallic base plate to define an intermediate space therebetween to slidably accommodate the flexible membrane therebetween.

18. The electric machine of claim 11, wherein the non-metallic base plate is made from nylon reinforced rubber.

19. The electric machine of claim 11, wherein the flexible membrane is made from rubber or a polymer.

20. The electric machine of claim 11, wherein the head plate is made from one of a metal or an alloy.

* * * * *